United States Patent
Wirola et al.

(10) Patent No.: US 10,887,859 B2
(45) Date of Patent: Jan. 5, 2021

(54) METHOD AND SYSTEM FOR OBTAINING SERVICES

(71) Applicant: Nokia Corporation, Espoo (FI)

(72) Inventors: Lauri Wirola, Tampere (FI); Ismo Halivaara, Tampere (FI); Jari Syrjarinne, Tampere (FI)

(73) Assignee: Nokia Technologies Oy, Espoo (FI)

( * ) Notice: Subject to any disclaimer, the term of this patent is extended or adjusted under 35 U.S.C. 154(b) by 791 days.

(21) Appl. No.: 13/871,201

(22) Filed: Apr. 26, 2013

(65) Prior Publication Data

US 2013/0237252 A1 Sep. 12, 2013

Related U.S. Application Data

(63) Continuation of application No. 12/992,750, filed as application No. PCT/FI2009/050355 on May 4, 2009, now Pat. No. 8,626,598.

(Continued)

(51) Int. Cl.
*G06Q 30/06* (2012.01)
*H04W 64/00* (2009.01)
(Continued)

(52) U.S. Cl.
CPC ............ *H04W 64/00* (2013.01); *G01S 19/05* (2013.01); *G06Q 30/0601* (2013.01);
(Continued)

(58) Field of Classification Search
CPC ................................................ G06Q 30/06–08
(Continued)

(56) References Cited

U.S. PATENT DOCUMENTS 5,923,287 A * 7/1999 Lennen ................... G01S 19/36
342/357.73
6,522,875 B1 2/2003 Dowling et al.
(Continued)

FOREIGN PATENT DOCUMENTS

EP 1443791 A1 8/2004
EP 1 863 314 A2 12/2007
(Continued)

OTHER PUBLICATIONS

Secure User Plance Location Requirements, Open Mobile Alliance, Candidate Version 2.0, Jan. 16, 2007, available at: http://openmobilealliance.org/release/SUPL/V2_0-20070116-C/OMA-RD-SUPL-V2_0-20070116-C.pdf (Year: 2007).*

(Continued)

*Primary Examiner* — Ming Shui
(74) *Attorney, Agent, or Firm* — Alston & Bird LLP (57) ABSTRACT

A method for obtaining a service by a first terminal related to a network entity, the method comprising receiving information indicative of capabilities related to the network entity, and selecting one or more of the capabilities. A further method for obtaining a service by a terminal related to an assistance server comprising sending by the terminal a capability request, and receiving, in the terminal, information indicative of capabilities related to the assistance server, wherein the information indicative of capabilities comprises indications of available assistance related to the assistance server.

11 Claims, 9 Drawing Sheets

Related U.S. Application Data (60) Provisional application No. 61/074,073, filed on Jun. 19, 2008, provisional application No. 61/053,175, filed on May 14, 2008.

(51) Int. Cl.
*H04W 4/029* (2018.01)
*H04W 4/24* (2018.01)
*G01S 19/05* (2010.01)
*H04L 29/08* (2006.01)
*H04L 29/06* (2006.01)

(52) U.S. Cl.
CPC ......... *G06Q 30/0641* (2013.01); *H04L 67/18* (2013.01); *H04W 4/029* (2018.02); *H04W 4/24* (2013.01); *H04L 69/24* (2013.01); *H04W 64/003* (2013.01)

(58) Field of Classification Search
USPC ...................................... 705/27.1, 26.1–27.2
See application file for complete search history.

(56) References Cited

U.S. PATENT DOCUMENTS

| | | | |
|---|---|---|---|
| 2003/0100307 A1 | 5/2003 | Wolochow et al. | |
| 2003/0110094 A1 | 6/2003 | Gulliver et al. | |
| 2004/0054802 A1 | 3/2004 | Beauchamp et al. | |
| 2004/0162052 A1 | 8/2004 | Jang et al. | |
| 2005/0286466 A1 | 12/2005 | Tagg et al. | |
| 2007/0004394 A1* | 1/2007 | Chu | H04W 24/08 455/422.1 |
| 2007/0032249 A1 | 2/2007 | Krishnamurthi et al. | |
| 2007/0055445 A1* | 3/2007 | Janky | H04L 9/3247 701/486 |
| 2007/0082682 A1 | 4/2007 | Kim et al. | |
| 2007/0270161 A1 | 11/2007 | Hampel et al. | |
| 2008/0155020 A1 | 6/2008 | Beauchamp et al. | |
| 2008/0231499 A1* | 9/2008 | Kim | G01S 5/0036 342/146 |
| 2008/0320419 A1* | 12/2008 | Matas | G01C 21/20 715/863 |
| 2009/0143076 A1* | 6/2009 | Wachter | H04W 64/00 455/456.1 |

FOREIGN PATENT DOCUMENTS

| | | |
|---|---|---|
| RU | 2255433 C2 | 6/2005 |
| RU | 2291072 C1 | 1/2007 |
| WO | WO 2003/005750 A1 | 1/2003 |
| WO | WO 2006/118401 | 11/2006 |
| WO | WO 2007/025143 AI | 3/2007 |

OTHER PUBLICATIONS

What is the Difference Between GNSS and GPS?, https://www.semiconductorstore.com/blog/2015/What-is-the-Difference-Between-GNSS-and-GPS/1550/, Dec 16, 2015 (Year: 2015).*
Supplementary European Search Report for Application No. 09 74 5880 dated Feb, 9, 2015.
Office Action for Chinese Application No. 200980121836.4 dated Mar. 17, 2014.
Office Action for Korean Application No. 2010-7027894 dated Feb. 2, 2012, 5 pages.
Office Action for Russian Application No. 2010150509 dated Oct. 18, 2011, 8 pages.
Written Opinion for Application No. PCT/FI2009/050355 dated Jul. 31, 2009, 7 pages.
International Search Report for Application No. PCT/FI2009/050355 dated Jul. 31, 2009, 4 pages.
International Preliminary Report on Patentability for Application No. PCT/FI2009/050355 dated Jun. 9, 2010, 9 pages.
Russian Office Action for Application No. RU2010150509, dated Nov. 8, 2011.
Office Action for Chinese Application No. 200980121836.4 dated Dec. 18, 2012.
Canadian Office Action for Application No. 2,723,976, dated Mar. 28, 2013.
"3GPP TS 36.355 V10.6.0;" 3rd Generation Partnership Project; Technical Specification Group Radio Access Network; Evolved Universal Terrestrial Radio Access (E-UTRA); LTE Positioning Protocol (LPP) (Release 10); dated Sep. 2012; retrieved on Jul. 31, 2013 from <http://www.3gpp.org/ftp/Specs/archive/36_series/36.355/>.
"3GPP TS 44.031 V10.0.0;" 3rd Generation Partnership Project; Technical Specification Group GSM/EDGE Radio Access Network; Location Services (LCS); Mobile Station (MS)—Serving Mobile Location Centre (SMLC); Radio Resource LCS Protocol (RRLP) (Release 10); dated Jun. 2010; retrieved on Jul. 31, 2013 from <http://www.3gpp.org/ftp/Specs/archive/44_series/44.031/>.
Office Action for Australian Application No. 2009247992; dated Jul. 12, 2013.
European Search Report for Application No. EP 12 19 3530 dated Aug. 1, 2013.
Miura, M. et al., *SUPL Multi-session clarification; OMA-LOC-2006-0151-CR-ULP-TS-SUPL1-Multi-Session-Clarification*, Open Mobile Alliance (OMA), San Diego, CA, Jun. 3, 2006, pp. 1-4.
Tran, K. et al., *New Status Code serviceNotSupported; OMA-LOC-2008-0133-CR_SUPL2.0_TL_ULP_New_Status_Code_serviceNotSupported*, Open Mobile Alliance (OMA), San Diego, CA, Feb. 21, 2008, pp. 1-13.
Cingular Unveils PDA-Based Wireless GPS Navigation System with 3D Moving Maps. PR Newswire [New York] Nov. 20, 2006.
Navicore Showcases New Interactive Services at 3GSM which Enrich Mobile Phoned-based GPS Navigation, Barcelona, Feb. 13-16, 2006. M2 Presswire [Coventry] Feb. 10, 2006: 1.
Office Action for U.S. Appl. No. 12/992,750 dated Aug. 16, 2012.
Notice of Allowance for U.S. Appl. No. 12/992,750 dated Sep. 26, 2013.
Office Action for U.S. Appl. No. 12/992,750 dated Mar. 18, 2013.
Communication from European Application No. 12193530.8 dated Jun. 15, 2016.

* cited by examiner

METHOD AND SYSTEM FOR OBTAINING SERVICES

This application is a continuation of U.S. patent application Ser. No. 12/992,750, filed Nov. 15, 2010, which is a national stage filing under 35 U.S.C. 371 of PCT/FI2009/050355, filed May 4, 2009, which claims priority to U.S. provisional applications 61/053,175, filed May 14, 2008, and 61/074,073, filed Jun. 19, 2008. The contents of the parent application, U.S. Ser. No. 12/992,750, are incorporated herein in its entirety.

FIELD OF INVENTION

This invention relates generally to wireless communication. In particular, the present invention relates to exchange of information related to capabilities and charging for such capabilities, such as capabilities associated with assisted satellite positioning.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Location services based on the location of mobile devices are becoming increasingly widespread. Assistance data for assisted navigation systems, such as global navigation satellite systems (GNSS) (e.g., Global Positioning System (GPS), Global Navigation Satellite System (GLONASS) and Galileo) have been specified and standardized for cellular systems. The delivery of such assistance data can be built on top of cellular system-specific control plane protocols including, e.g., the radio resource location services protocol (RRLP) for GSM networks, the radio resource control (RRC) layer of layer 3 in wideband code division multiple access (WCDMA) networks, and IS-801 for CDMA networks, standardized in 3GPP/3GPP2.

The Open Mobile Alliance (OMA) has defined a user plane protocol referred to as secure user plane location (SUPL). SUPL employs user plane data bearers for transferring location assistance information such as GNSS assistance data for carrying positioning technology-related protocols between a user terminal (e.g., a mobile communication device) and its operating network. SUPL is intended to be an alternative and a complement to the existing standards based on signaling in the mobile network control plane. SUPL assumes that a mobile or other network can establish a data bearer connection between a terminal and some type of location server. The use of a user plane protocol becomes especially appealing in case of IP networks where the data bearer is available by nature.

SUPL includes a mechanism for the terminal to report its capabilities to the network element providing assistance. This capability report includes an indication, whether the terminal is capable to perform, for instance, SUPL-enabled terminal (SET) assisted AGPS (Assisted Global Positioning System), SET-based AGPS or E-CID (Enhanced Cell-ID). Moreover, the report contains information on which satellite systems (such as GLONASS, Galileo, etc.) and signals (such as GLONASS L1, GLONASS L2, etc.) the terminal is capable of supporting. This information indicates the network element, which assistance data it can provide the terminal.

The current solution, in which the terminal reports its capabilities to the network, is sufficient for the known purposes, in which there is either:

one terminal and one assistance server providing the terminal assistance data; or one terminal, one assistance server and the other terminal, of which position the first terminal is able to query.

In the latter case the first terminal requests the location of the other terminal periodically and the network element queries the position of the other terminal. There is no interaction between the two terminals.

In order to provide advanced Location Based Services (LBS), the first terminal may wish to request the location of the other terminal at certain Quality-Of-Service level (for example, using some particular positioning technology) or request GNSS measurements on certain signals. However, in many instances, the user of the first terminal may be unable to receive necessary information to obtain the desired service.

Similar to SUPL, in OMA SUPL 2.0, when the positioning session is initiated, the SET is required to report its capabilities to the assistance server (SLP). This report indicates the assistance server, which GPS positioning methods (e.g., SET-assisted AGPS, SET-based AGPS, Autonomous GPS), GANSS positioning methods (e.g., SET-assisted, SET-based, Autonomous) and RAN-based methods (e.g., AFLT, E-CID, E-OTD, OTDOA) the SET supports. Moreover, the support for different satellite systems (e.g., such as Galileo, GLONASS, etc.) and signals (Galileo E1, Galileo E5a, GLONASS G1, GLONASS G2, etc.) is reported. However, there is no similar signaling the other way round. This means that the SLP cannot report (and SET cannot request) the SLP's capabilities to the terminal.

SUMMARY OF THE INVENTION

In one aspect, the invention relates to a method for obtaining a service by a first terminal related to a network entity, the method comprising receiving information indicative of capabilities related to the network entity; and selecting one or more of the capabilities.

In one embodiment, the network entity is a second terminal and the capabilities are available services related to the second terminal. In one embodiment, the information is indicative of capabilities and/or subscriptions of the second terminal. In one embodiment, the available services are related to locating of the second terminal. The available services may include low-accuracy positioning and high-accuracy positioning services. In one embodiment, the available services include free services and services available at a cost. The method may further comprise accessing payment service to obtain access to one or more services available at a cost.

In one embodiment, the network entity is an assistance server and the information indicative of capabilities includes indications of available assistance related to the assistance server. In one embodiment, the indications of available assistance includes an indication that assistance data is available. In one embodiment, the indications of available assistance includes an indication of the format in which assistance is available. In one embodiment, the indications of available assistance includes an indication of GNSSs for which assistance is available. In one embodiment, the indications of available assistance includes an indication of accuracy at which assistance is available.

In another aspect, the invention includes an apparatus comprising a processor and a memory unit communicatively connected to the processor. The memory unit includes computer code for receiving information indicative of capabilities related to the network entity; and computer code for selecting one or more of the capabilities.

In another aspect, the invention includes a computer program product embodied on a computer-readable medium, comprising a computer code for receiving information indicative of capabilities related to the network entity; and a computer code for selecting one or more of the capabilities.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF THE VARIOUS EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As noted above, in many cases, the user of the first terminal may be unable to obtain a desired service for lack of being able to receive necessary information. For example, in some cases, the first terminal may request high-accuracy position of the second terminal. In many cases, the second terminal may be unable to provide such information for a number of reasons, such as:

1) the second terminal does not have the capability to provide such service due to hardware or software restrictions;

2) the second terminal has the capability but has not subscribed to the appropriate service; and 3) the second terminal has the capability and a valid subscription, but the second terminal is unable to provide the information because, for example, GNSS signal conditions may be such that the terminal cannot determine its position.

Without exchange of capability information, the user of the first terminal may receive in the above three cases the same indication as in a case of no-returned position. Further, the user of the first terminal would have no information based on which the user of the first terminal could modify the request, e.g., use another method, request termination, etc. The exchange of subscription information between the first and second terminals is not possible either.

Embodiments of the present invention provide solutions for such cases. In accordance with embodiments of the present invention, exchange of capability information and/or service-subscription information between two or more terminals is provided. In one embodiment, the users are provided with control on the positioning methods and Quality-Of-Service for positioning events taking place between two or more terminals. In one embodiment, the users are provided with a capability to subscribe to capabilities on-the-fly on behalf of the other terminal. In one embodiment, exchange of information between two or more terminals is provided in such a way that an assistance server stores capability information and/or service-subscription information. One embodiment includes a charging mechanism wherein the requesting terminal may cover more than its own direct positioning costs.

In accordance with embodiments of the invention, exchange of capability and/or subscription information between the two or more terminals includes at least information on the supported GNSSs, GNSS signals, measurement types (e.g., code phase, carrier phase), supported positioning methods (assisted GNSS (AGNSS), Cell-ID, high-accuracy positioning), costs and cost structures of the services and subscriptions to the associated services. For example, if the second terminal has a subscription to a Virtual Reference Station (VRS) allowing the terminal to be positioned at high absolute accuracy, this is indicated in the subscription exchange.

Figure 1:
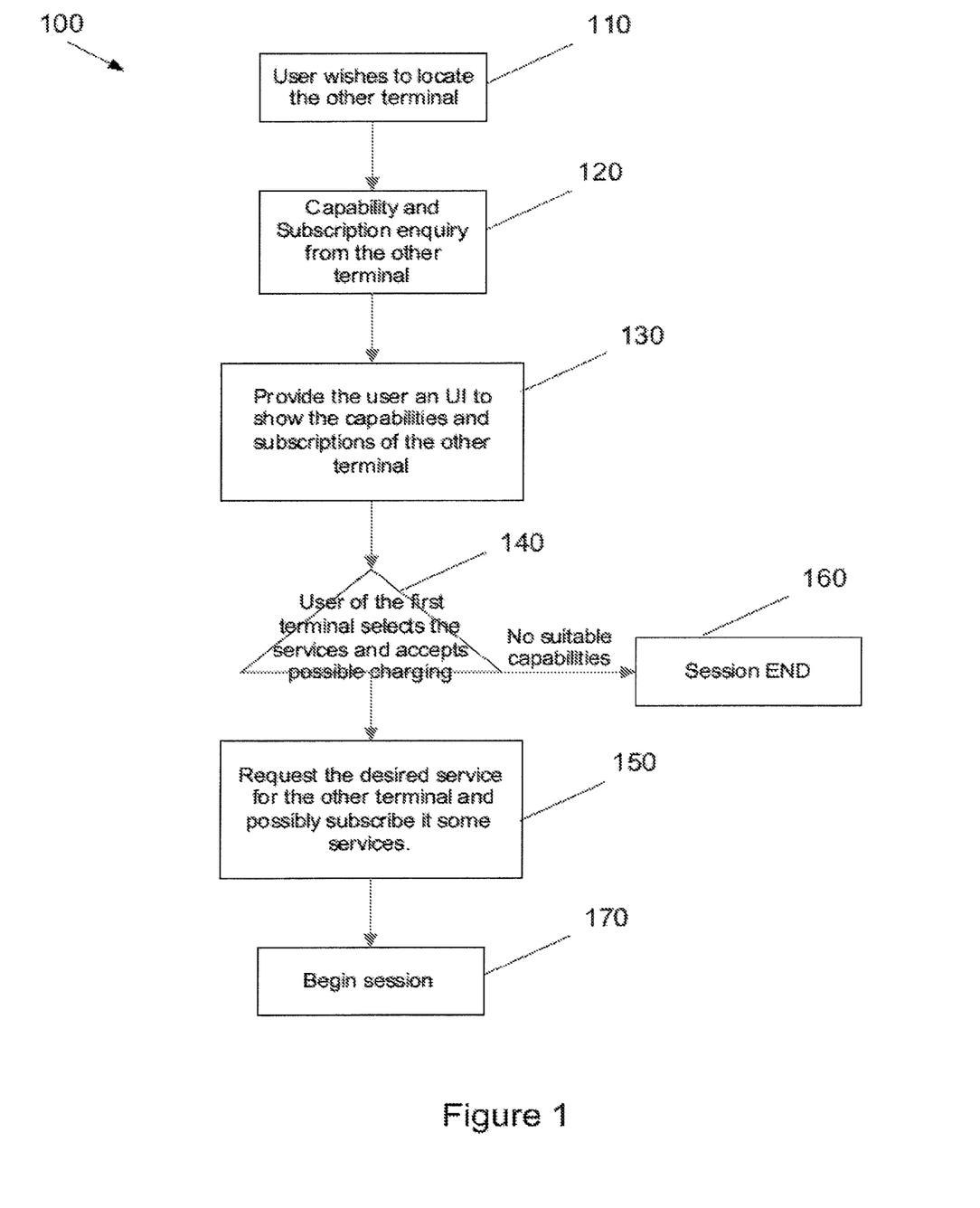
FIG. 1 illustrates a flow chart of an exemplary process by which a user of a first terminal may locate a second terminal in accordance with an embodiment of the present invention.

Referring now to FIG. 1, a flow chart is provided illustrating an exemplary process by which the user of a first terminal may locate a second terminal in accordance with embodiments of the present invention. In accordance with the exemplary process 100, the user of the first terminal wishing to locate a second terminal (block 110) requests capabilities and subscriptions of the second terminal (block 120). The capabilities and subscriptions of the second terminal are shown to the user of the first terminal (block 130). In various embodiments, the information may be displayed to the user of the first terminal through a user interface (UI). In one embodiment, the information is displayed to the user of the first terminal in terms of quality-of-service and cost. The user of the first terminal can then make decisions on the desired actions (block 140). For example, if the user of the first terminal determines that no suitable capabilities exist, the session may be terminated (block 160). On the other hand, the user of the first terminal may select one or more of the available services and, if necessary, accept the charges for any associated costs. The desired service is then requested for the second terminal and, if necessary, one or more services may be subscribed for the second terminal (block 150). The session may then be initiated (block 170).

Figure 2:
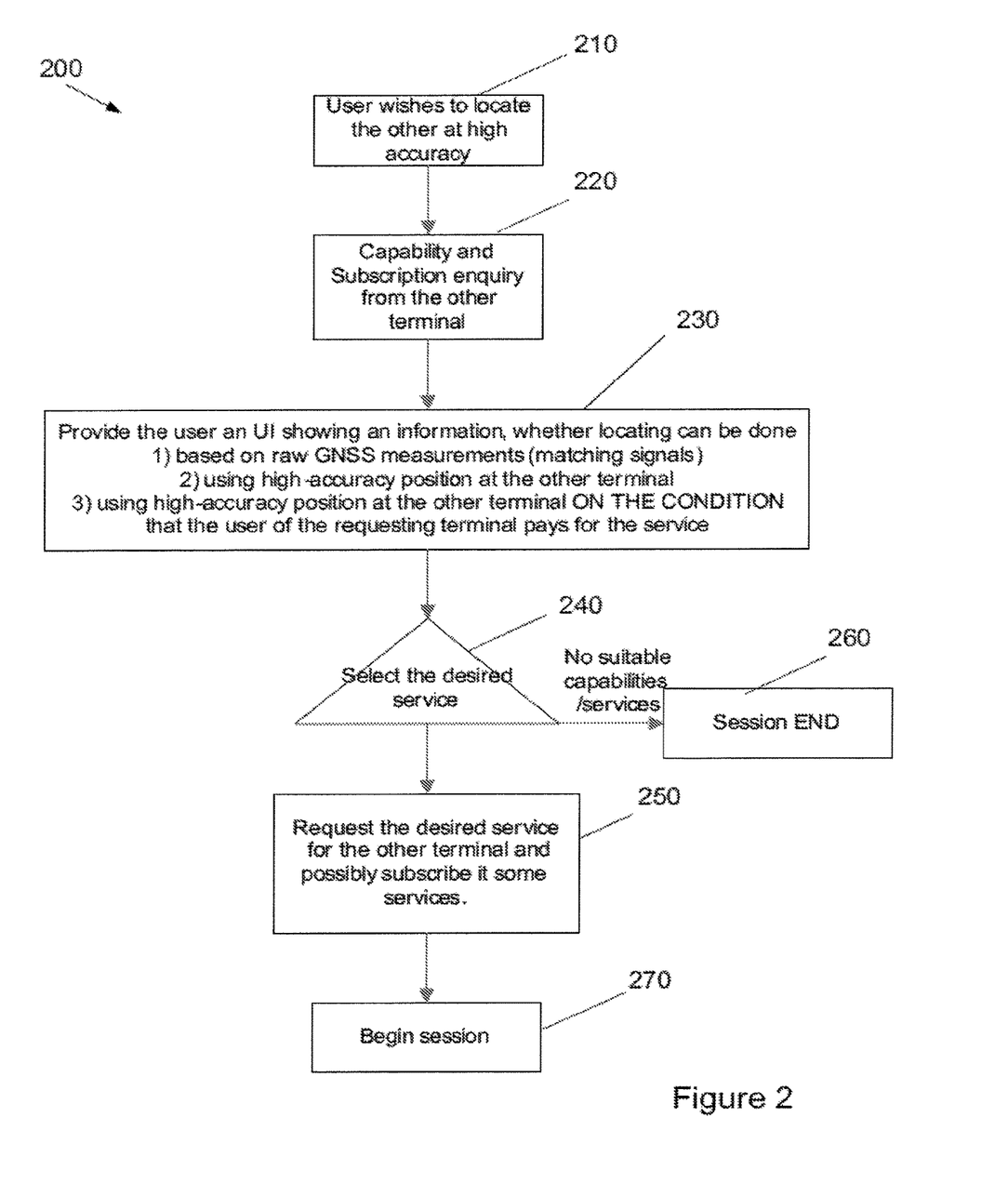
FIG. 2 illustrates a flow chart of an exemplary process by which a user of a first terminal may locate a second terminal in accordance with another embodiment of the present invention.

FIG. 2 illustrates an exemplary process 200 by which the user of a first terminal may locate the second terminal in accordance with another embodiment of the present invention. In accordance with the exemplary process 200, the user of the first terminal wishing to locate a second terminal (block 210) requests capabilities and subscriptions of the second terminal (block 220). In the illustrated example, the user of the first terminal is provided with a list of options indicating services or capabilities available at no cost and services or capabilities available with a payment (block 230). For example, the user may be provided with information indicating that 10-meter accurate position is available at no cost, but 0.1-meter accurate position is available at a cost. In this regard, the second terminal may have a capability for high-accuracy positioning, but not a subscription for the appropriate service. The user of the first terminal may then select the appropriate service (block 240), which may include buying a subscription for the second terminal to high accuracy positioning for a limited period of time. A linkage to the charging functionalities may be provided in embodiments of the present invention.

If, at block 240, the user of the first terminal determines that no suitable capabilities exist, the session may be terminated (block 260). On the other hand, the user of the first terminal may select one or more of the available services and, if necessary, accept the charges for any associated costs. The desired service is then requested for the second terminal and, if necessary, one or more services may be subscribed for the second terminal (block 250). The session may then be initiated (block 270).

Figure 3:
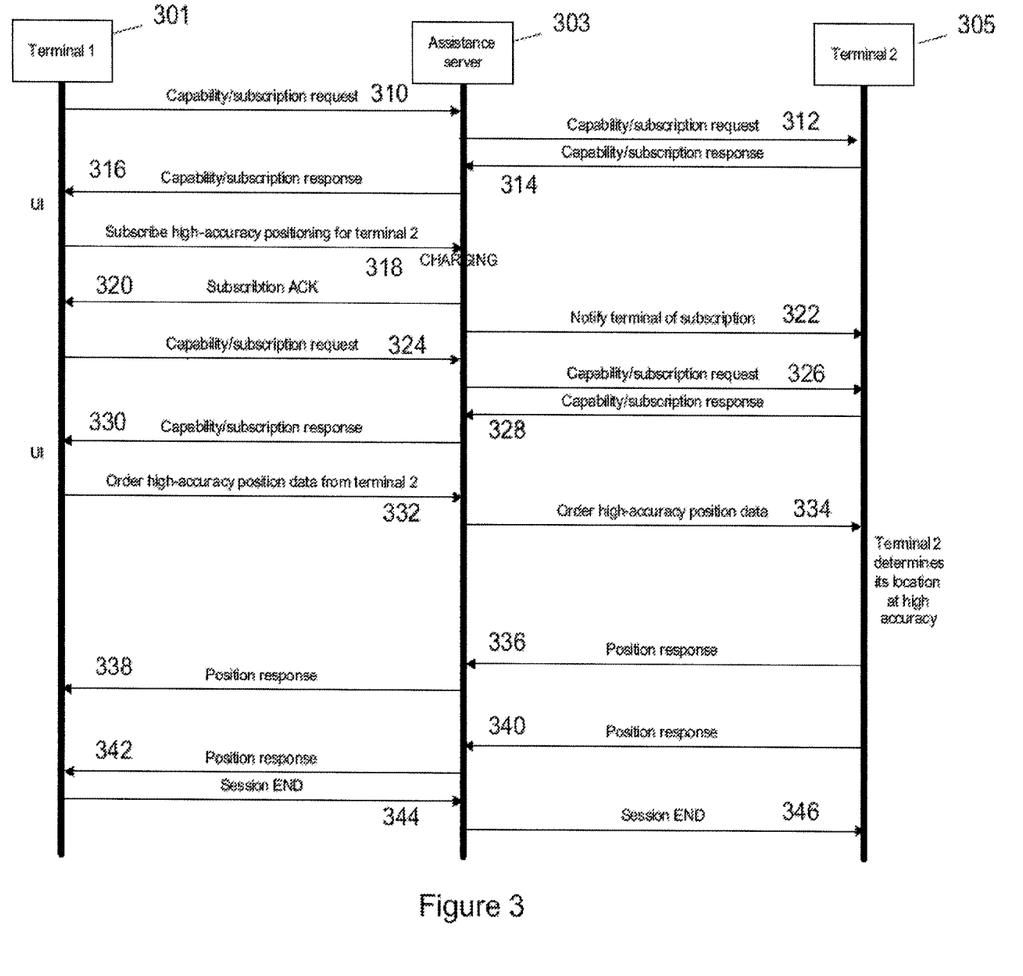
FIG. 3 illustrates an exemplary flow diagram related to the exemplary process of FIG. 2.

FIG. 3 illustrates an exemplary flow diagram related to the exemplary process described above with reference to FIG. 2. The messages which may be required for setting up the connections and protocols are not shown in FIG. 3. The first four messages (310-316) are related to the exchange of information relating to capabilities and/or subscription. In this regard, in one embodiment, the information is exchanged between the first terminal 301 and the second terminal 305 through an assistance server 303.

In another embodiment, the information may be exchanged directly between the first terminal 301 and the second terminal 305. Thus, the assistance server 303 may be either eliminated or bypassed.

In still another embodiment, the assistance server 303 may be a part of a terminal. For example, the assistance server 303 may be a mobile server located in the first terminal 301 or the second terminal 305.

Messages 318-322 are related to subscribing high-accuracy positioning capability for the second terminal 305. Another exchange of information related to capability and/or subscription then occurs (324-330). The first terminal 301 then requests high-accuracy location from the second terminal 305 (332-334). The second terminal 305 may then set up a high-accuracy positioning session with the same assistance server 303 or another assistance server (not shown). The second terminal 305 then starts reporting location data back to the first terminal 301 on a periodic basis (336-342). While the example of FIG. 3 illustrates two instances of such reporting, those skilled in the art will understand that the number and frequency of such instances may vary in various embodiments and are contemplated within the scope of the present invention. The session may then be terminated (344-346), for example, at the request of the first terminal 301, at the request of the second terminal 305, or upon expiration of the subscription.

Figure 4:
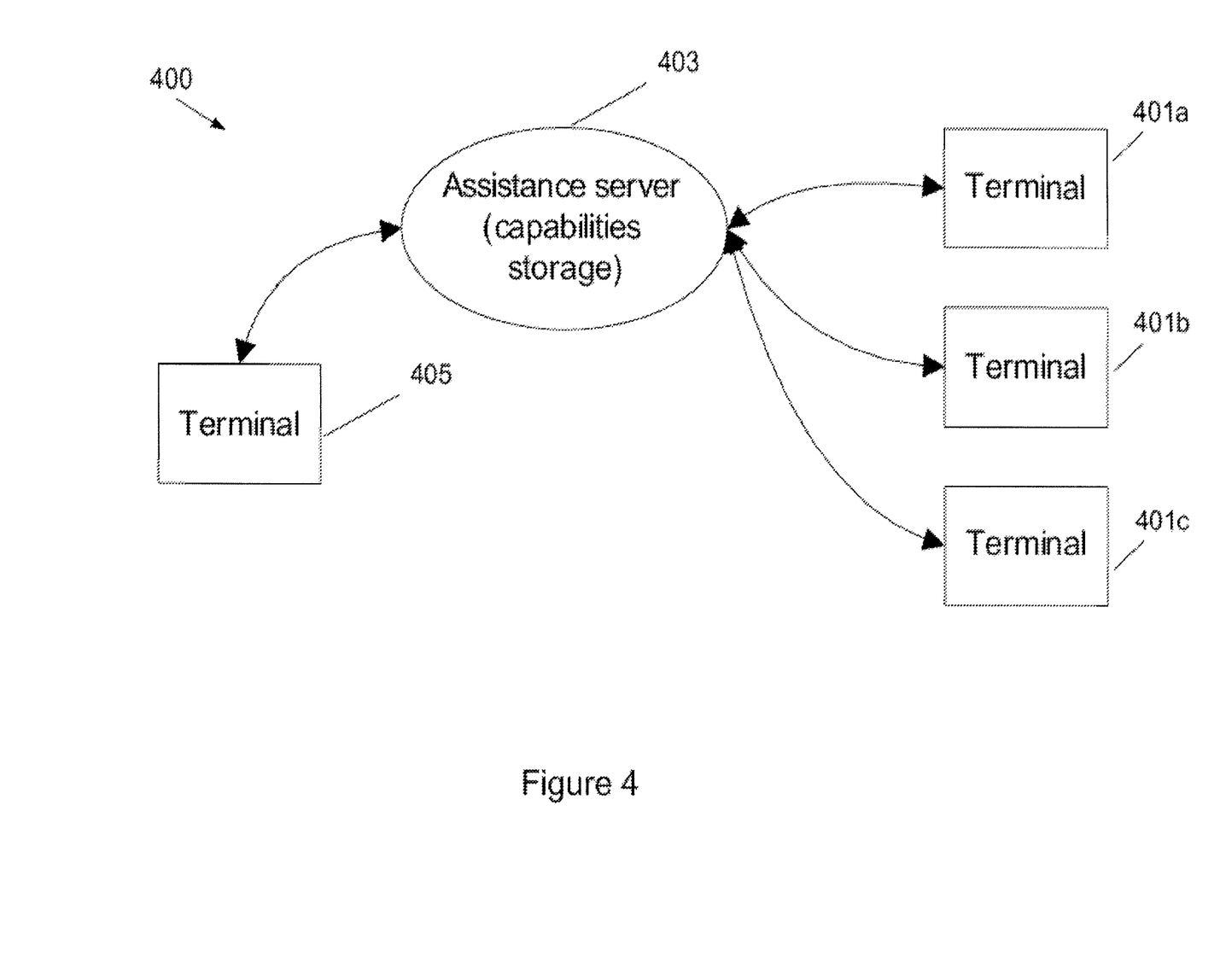
FIG. 4 is a diagram which schematically illustrates an exemplary case in accordance with another embodiment of the present invention.

FIG. 4 is a diagram which schematically illustrates an exemplary case in which multiple users may locate a given terminal. In accordance with embodiments of the present invention, the capability and/or subscription information of a target terminal 405 may be stored on an assistance server 403. In this manner, users at one or more terminals 401*a-c* may exchange such information through the assistance server. In this regard, the need to query the target terminal 405 is eliminated.

As noted above, currently, the SET does not have information on the capabilities of the assistance server. The lack of the SLP capability report highlights that the computational as well as other capabilities of the terminals have been very limited in the past. Moreover, the variety of positioning methods as well as assistance data has been smaller. Previously, the assistance server was given more control in the positioning session in deciding which positioning method to use and what assistance to provide to the SET.

However, the situation is changing in terms of the capabilities of SETs, available positioning methods and assistance data. New GNSS-based positioning methods include Real-Time Kinematics and Precise Point Positioning, both providing highly accurate positioning services. New types of assistance data include high accuracy orbit models as well as real-time ionosphere maps, both contributing to higher accuracy and availability of navigation services. In this new environment, it is desirable for the SET to know what assistance data and support is available from the assistance server. This ensures the use of the most efficient positioning method and assistance by the SET all the time.

Currently, the SET does not have information on the capabilities of the assistance server. Hence, if the SET user wishes to locate himself or herself using the best possible accuracy, the terminal needs to request assistance data blindly. If the request fails, the SET user cannot be notified whether the failure was due to a temporary error, in which case a new attempt can be made, or if certain required assistance data type is not available, in which case another positioning method should be chosen. With increasing number of options available for positioning, the situation of the SET not knowing about available assistance can lead to a contradiction in the functioning of the SET.

Moreover, the different types of assistance data may be charged differently. In this case, it may be desirable that the SET can request information on the availability of different assistance data and possibly also on the charging. The problem in the current solution is that the only option for the SET is to request for the assistance data and then either receive the data or an error. Again, in such a case the SET user cannot be notified of the cause of the failure (e.g., a general error, lack of assistance or lack of subscriptions, etc.). Moreover, charging indication cannot be provided to the user beforehand.

In accordance with embodiments of the present invention, the SET may receive information indicative of the capabilities of the assistance server. In this regard, an assistance server capability report may be provided to indicate, for example, (1) assistance data available; (2) the format in which the assistance is available for appropriate types of assistance data; (3) the GNSSs for which the assistance is available for appropriate types of assistance data; (4) the GNSSs and signals for which the assistance is available for appropriate types of assistance data; (5) the accuracy at which the assistance is available for appropriate types of assistance data; (6) the subset of assistance data available for appropriate types of assistance data; or (7) any combination of the above capability indications and a terminal acting based upon the assistance server capability. Further, based on the assistance server capabilities, terminal capabilities and/or user preferences, a terminal may choose the combination of available assistance data that provides the best fit.

Figure 5:
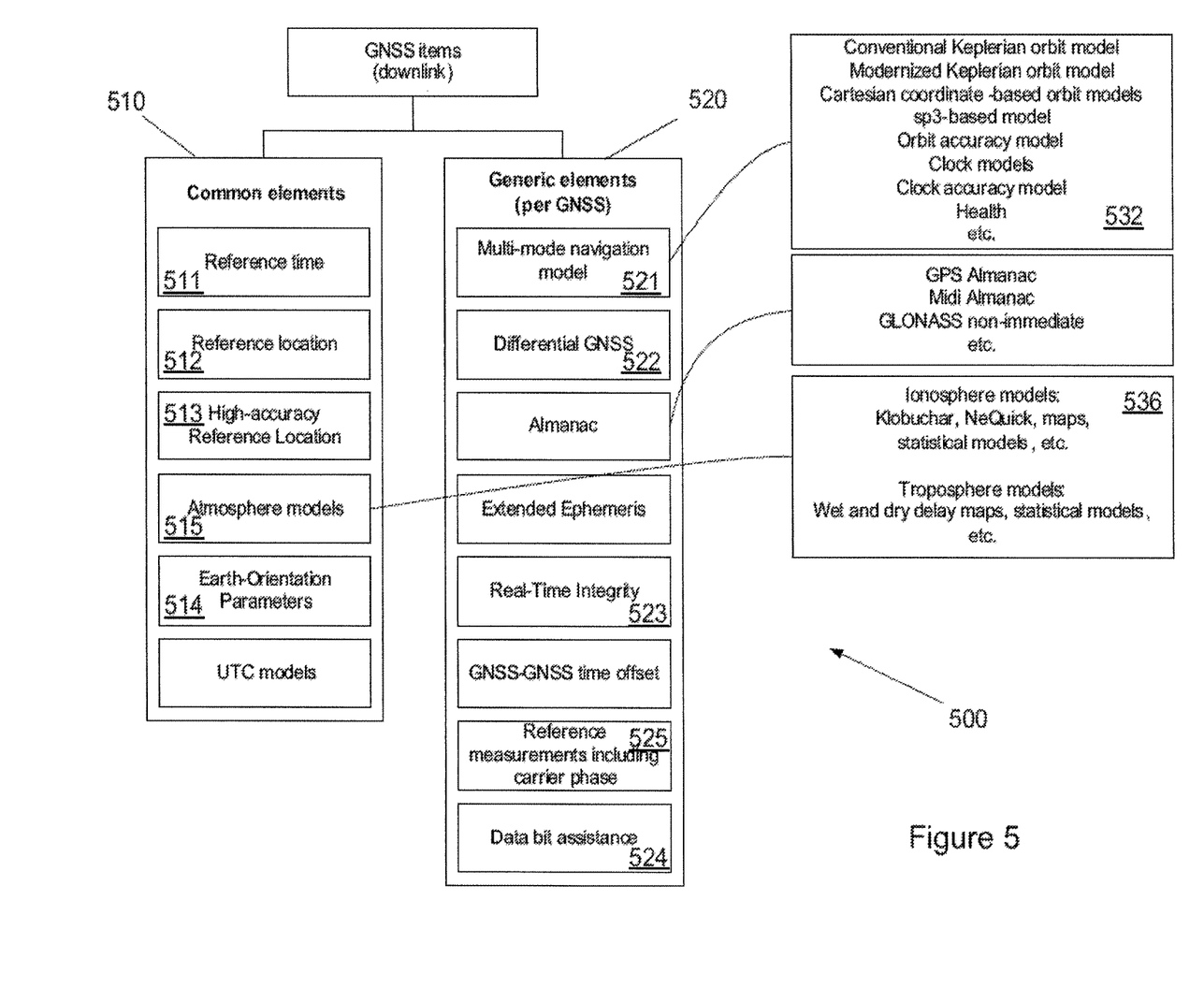
FIG. 5 illustrates an exemplary set of assistance data in accordance with embodiments of the present invention.

FIG. 5 illustrates an exemplary set 500 of assistance data that SUPL 2.1 supports in accordance with embodiments of the present invention. The structure of the exemplary set of FIG. 5 is also exemplary. In the embodiment illustrated in FIG. 5, the assistance data is divided into "Common Elements" 510 that are independent of GNSSs and signals and "Generic Elements" 520 that may be GNSS and/or signal dependent. The assistance data may be of various types. The embodiment illustrated in FIG. 5 shows three exemplary types of assistance data. Of course, in other embodiments, the assistance data may be divided into any number of data types.

Referring now to the "Common Elements" of FIG. 5, reference time 511 and reference location 512 are basic types of assistance and are typically always available. Reference time 511 may be provided, for instance, based on cellular frame timing—GNSS time relationships. Reference location 512 may be provided based on, for example, current serving cellular network cell.

Further, the availability of high-accuracy reference location 513 or Earth-orientation parameters (EOP) 514 is not self-evident. The availability of high-accuracy reference location 513 notifies the SET that the SLP has access to assistance data for high-accuracy positioning (such as, for example, Real-Time Kinematics). A notification to the SET that assistance data is available may indicate the availability of this type of data (e.g., GNSS-independent and only one type).

A notification to the SET of the format in which the assistance is available for appropriate types of assistance data may refer to, for example, atmosphere models 515 or ionosphere models 536 (e.g., several types, GNSS-independent). Ionosphere models 536 come in different formats. For example, one type is the global Klobuchar model in GPS broadcast. Galileo broadcast uses the NeQuick model. Moreover, there are regional high-accuracy ionosphere models and maps of which availability may also change depending upon the location of the SET.

A notification to the SET of the GNSSs for which the assistance is available for appropriate types of assistance data may refer to, for example, navigation models 521. The orbit models 532 may be provided per satellite and are generally signal-independent. Hence, it should be indicated that, for example, navigation models are available for GPS but not for GLONASS. For orbit models, for example, it may insufficient to indicate only for which GNSSs they are available, and it may also be required to indicate in which format. This is because there are several different parametrization for the same orbit. For example, GPS satellite orbits are readily available in Keplerian format in GPS broadcast or in high-accuracy format in sp3-format from the International GNSS Service (IGS). It is also possible that charging is based on the accuracies. Finally, the navigation model may also include clock models, which may be available per signal.

A notification to the SET of the availability of the GNSSs and signals for which the assistance is available for appropriate types of assistance data may refer to, for instance, Differential GNSS (DGNSS) assistance 522. Differential GNSS 522 is a technique to give the SET data to correct the GNSS measurements in order to achieve better accuracy. The corrections are signal-specific. The same also applies to, for instance, Real-Time Integrity 523 and Data Bit Assistance 524.

A notification to the SET of the availability of the accuracy at which the assistance is available for appropriate types of assistance data may refer to, for instance, accuracies at which orbit models are available, as described above.

A notification to the SET of the availability of the subset of assistance data for appropriate types of assistance data may refer to, for example, Reference Measurements 525. Even though the assistance server may be able to provide full set of Reference Measurements for GPS L1 signal, it may not be able to provide Carrier Phase, but only Code Phase measurements to GPS L2 signal. Hence, with Reference Measurements 525, it may be necessary to indicate for which GNSSs and for which signals the different subsets are available. This assistance data, therefore, may also require any combination of the above capability notifications.

Figure 6:
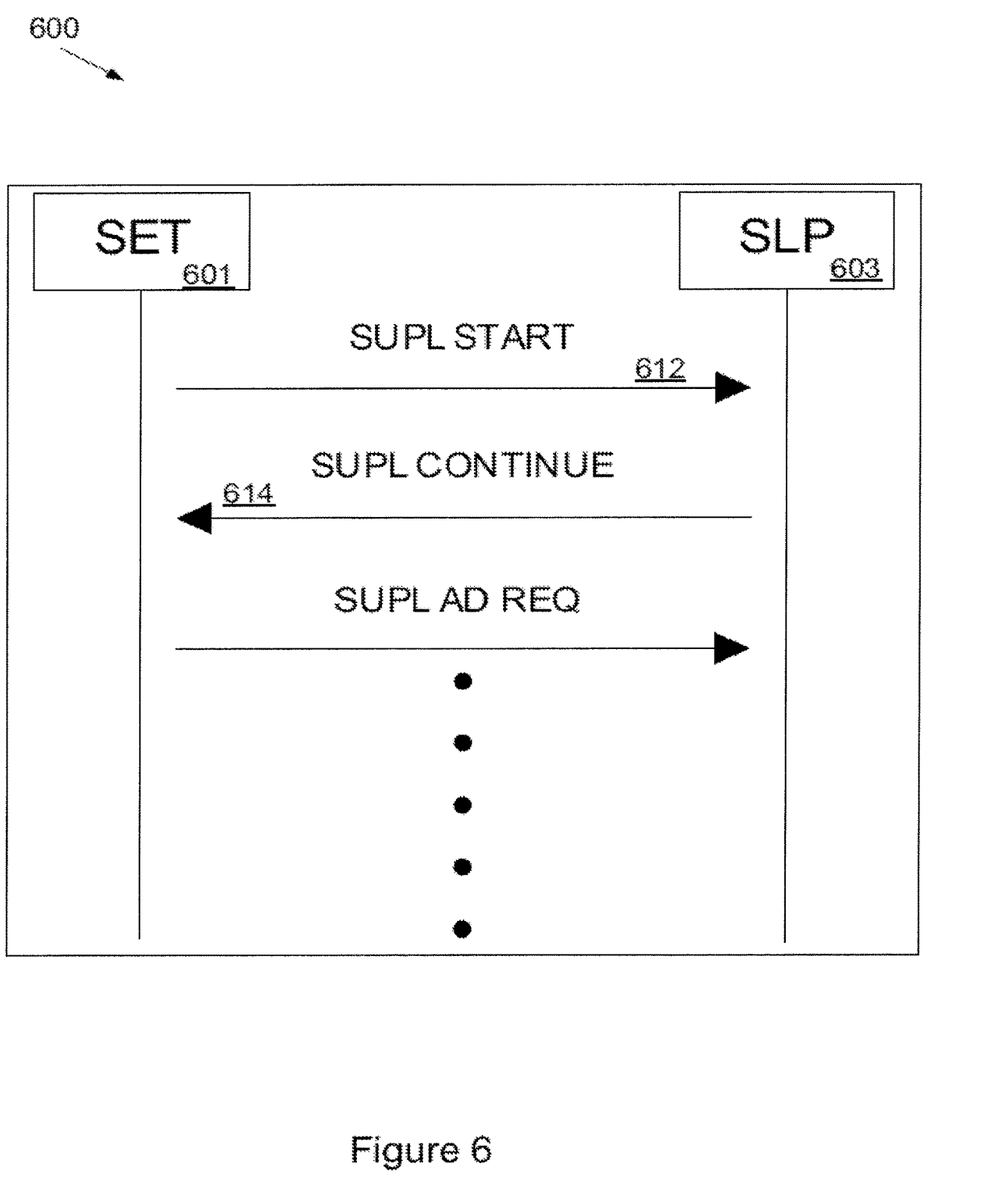
FIG. 6 illustrates an exemplary flow diagram in accordance with embodiments of the present invention.

FIG. 6 illustrates an exemplary flow diagram 600 for OMA SUPL 2.1 in an SET-initiated case in accordance with embodiments of the present invention. The SET 601 first sends the assistance server (SLP) 603 SUPL START 612. In the illustrated embodiment, the messages are illustrated as compatible with SUPL 2.0. Thus, the SET 601 is capable of SUPL 2.1 (or higher) messaging. If the SLP 603 is also capable of doing this, it responds with SUPL 2.1 message, SUPL CONTINUE 614. Those of skill in the art will understand that the name of the message is irrelevant and that only its use and content matters. SUPL CONTINUE 614 may include, among other, an indication for the SET 601 that the SLP 603 is capable of SUPL 2.1 messaging and potentially also able to provide the novel assistance data types available over SUPL 2.1. For this purpose, the message may also contain an information element for SLP capabilities. It is advantageous and natural that the SET receives the SLP capabilities as early in the session as possible.

Figure 7:
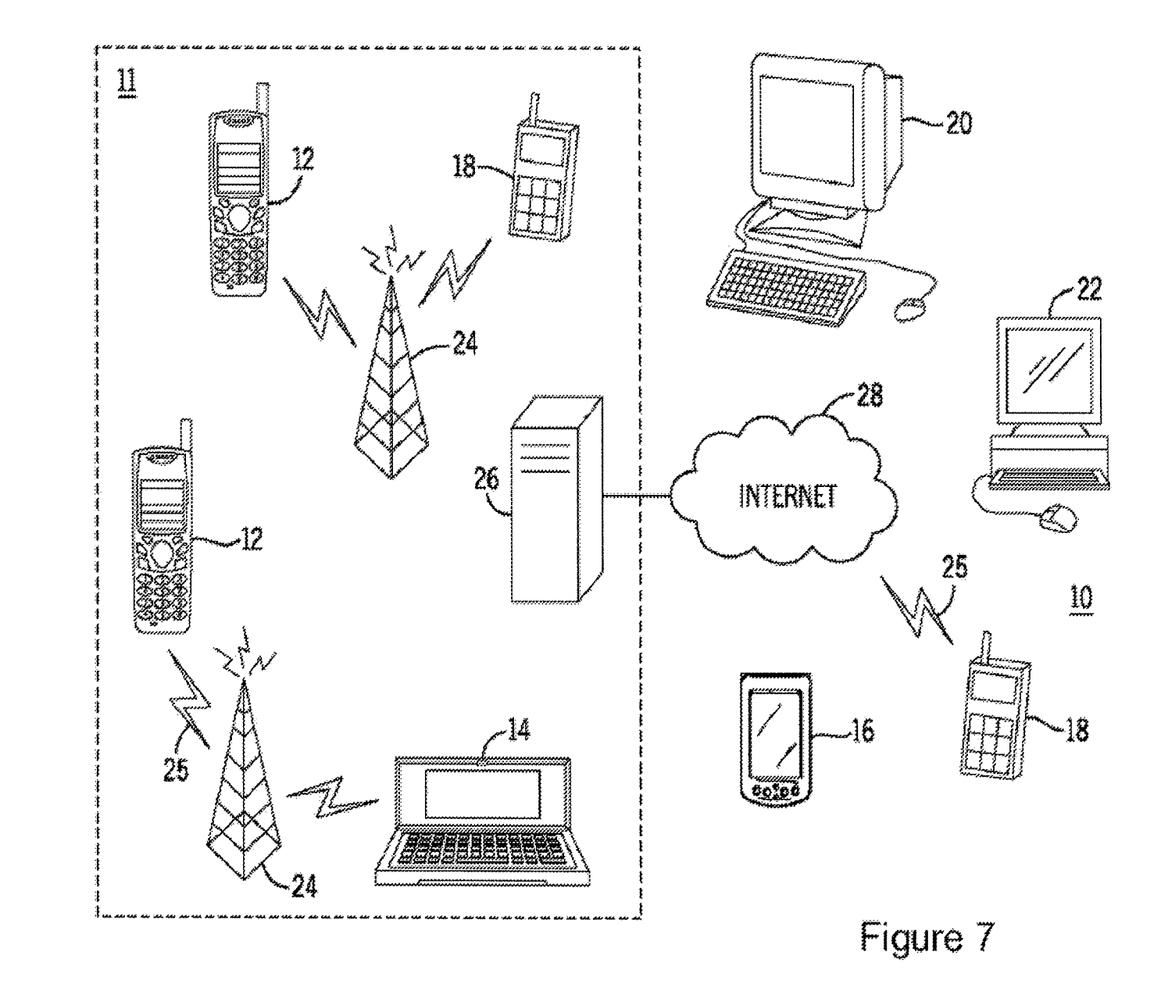
FIG. 7 is an overview diagram of a system within which various embodiments of the present invention may be implemented.

FIG. 7 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, WiMAX, LTE, IEEE 802.16, etc. The system 10 may include both wired and wireless communication devices.

For exemplification, the system 10 shown in FIG. 7 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 12 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, WiMAX, IEEE 802.16, LTE, etc. A communication device involved in implementing various embodiments of the present invention may communicate using various media including, but not limited to, radio, infrared, laser, cable connection, and the like.

Figure 8:
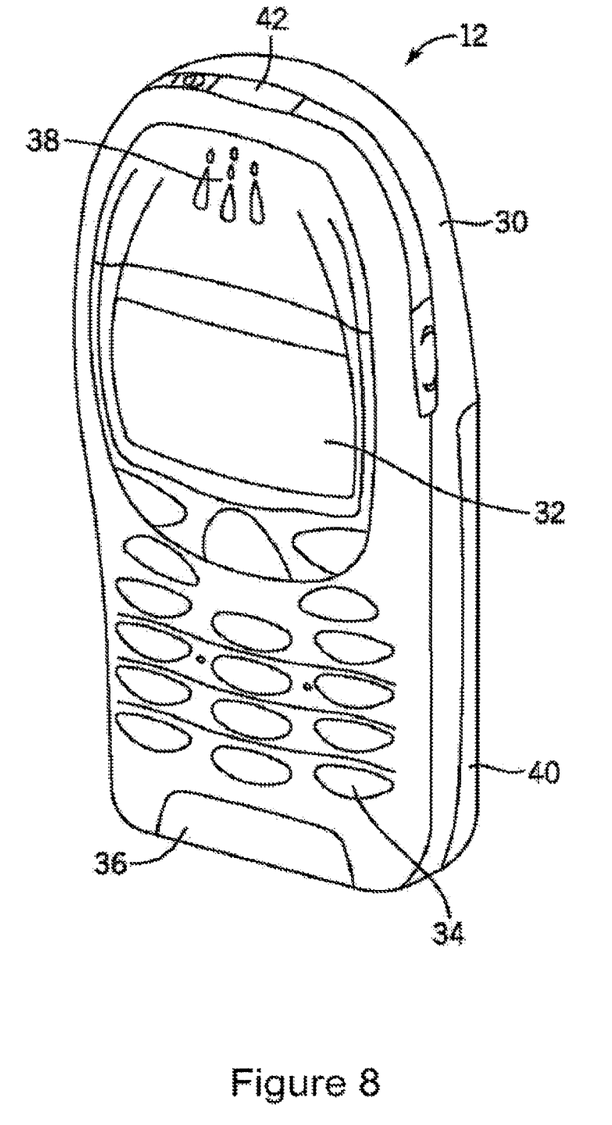
FIG. 8 illustrates a perspective view of an exemplary electronic device which may be utilized in accordance with the various embodiments of the present invention.
Figure 9:
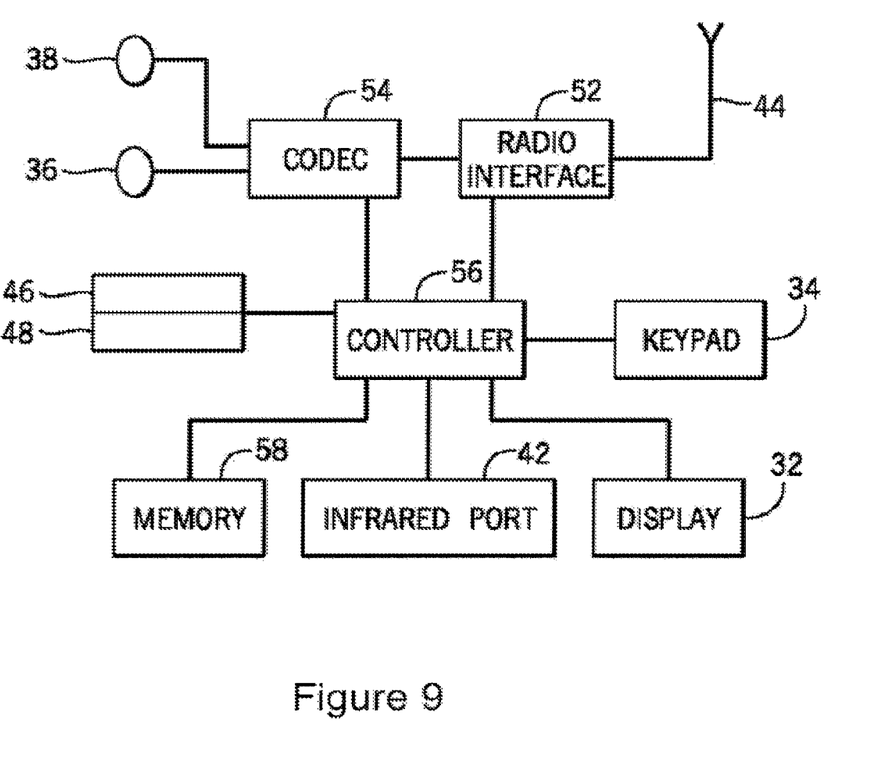
FIG. 9 is a schematic representation of the circuitry which may be included in the electronic device of FIG. 8.

FIGS. 8 and 9 show one representative electronic device 28 which may be used as a network node in accordance to the various embodiments of the present invention. It should be understood, however, that the scope of the present invention is not intended to be limited to one particular type of device. The electronic device 28 of FIGS. 8 and 9 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. The above described components enable the electronic device 28 to send/receive various messages to/from other devices that may reside on a network in accordance with the various embodiments of the present invention. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Embodiments of the present invention may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method implemented by an assisted navigation system for exchanging capabilities and/or service-subscription information between two or more terminals is provided, the method comprising:
    causing transmission of a message to an assistance server, the message comprising a request for capabilities and subscriptions of a second terminal;
    receiving information indicative of capabilities and service-subscriptions associated with assisted satellite positioning of the second terminal stored on the assistance server, wherein the information indicative of capabilities and service-subscriptions comprises capabilities and service-subscriptions available at no cost and capabilities and service-subscriptions available at a cost,
    wherein the capabilities and service-subscriptions comprise an indication of a plurality of different GNSSs (Global Navigation Satellite Systems), and
    wherein the information indicative of the second terminal capabilities was previously transmitted to the assistance server from the second terminal;
    selecting a positioning method from the plurality of different GNSSs based on the information indicative of capabilities and service-subscriptions associated with assisted satellite positioning of the second terminal stored on the assistance server; and
    receiving location data of the second terminal according to the selected positioning method.

2. The method of claim 1, wherein the capabilities and service-subscriptions comprise an indication that assistance data is available.

3. The method of claim 1, wherein the capabilities and service-subscriptions comprise an indication of a format in which assistance is available, and wherein the format in which assistance data is available is indicative of a type of ionosphere model.

4. The method of claim 1, wherein the capabilities and service-subscriptions further comprise an indication of signals for which assistance is available.

5. The method of claim 1, wherein the capabilities and service-subscriptions comprise an indication of accuracy at which assistance is available.

6. The method of claim 1, wherein the assistance server is a server located in a secure user plane location-enabled terminal (SET) or the second terminal.

7. A computer program product comprising a non-transitory computer readable medium of an assisted navigation system configured to exchange capabilities and/or service-subscription information between two or more terminals, the non-transitory computer readable medium having computer code instructions stored therein, said instructions when executed by a processor causing an apparatus to perform:
  causing transmission of a message to an assistance server, the message comprising a request for capabilities and subscriptions of a second terminal;
  receiving information indicative of capabilities and service-subscriptions associated with assisted satellite positioning of the second terminal stored on the assistance server, wherein the information indicative of capabilities and service-subscriptions comprises capabilities and service-subscriptions available at no cost and capabilities and service-subscriptions available at a cost,
  wherein the capabilities and service-subscriptions comprise an indication of a plurality of different GNSSs (Global Navigation Satellite Systems), and
  wherein the information indicative of the second terminal capabilities was previously transmitted to the assistance server from the second terminal;
  selecting a positioning method from the plurality of different GNSSs based on the information indicative of capabilities and service-subscriptions associated with assisted satellite positioning of the second terminal stored on the assistance server; and
  receiving location data of the second terminal according to the selected positioning method.

8. An apparatus of an assisted navigation system configured to exchange capabilities and/or service-subscription information between two or more terminals, the apparatus comprising:
  a processor; and
  a memory unit including computer program code;
  the memory and the computer program code configured to, with the processor, cause the apparatus at least to:
    cause transmission of a message to an assistance server, the message comprising a request for capabilities and subscriptions of a second terminal;
    receive information indicative of capabilities and service-subscriptions associated with assisted satellite positioning of the second terminal stored on the assistance server, wherein the information indicative of capabilities and service-subscriptions comprises capabilities and service-subscriptions available at no cost and capabilities and service-subscriptions available at a cost,
    wherein the capabilities and service-subscriptions comprise an indication of a plurality of different GNSSs (Global Navigation Satellite Systems), and
    wherein the information indicative of the second terminal capabilities was previously transmitted to the assistance server from the second terminal;
    select a positioning method from the plurality of different GNSSs based on the information indicative of capabilities and service-subscriptions associated with assisted satellite positioning of the second terminal stored on the assistance server; and
    receive location data of the second terminal according to the selected positioning method.

9. The apparatus of claim 8, wherein the capabilities and service-subscriptions comprise an indication that assistance data is available.

10. The apparatus of claim 8, wherein the capabilities and service-subscriptions comprise an indication of a format in which assistance is available.

11. The apparatus of claim 8, wherein the capabilities and service-subscriptions comprise an indication of accuracy at which assistance is available.

* * * * *